United States Patent [19]

Ishikawa et al.

[11] Patent Number: 4,897,570
[45] Date of Patent: Jan. 30, 1990

[54] STARTER MOTOR FOR AUTOMITOVE ENGINE

[75] Inventors: Yuzo Ishikawa; Masahiko Tahara, both of Yokosuka; Yuji Hirabayashi, Zushi, all of Japan

[73] Assignee: Nissan Motor Co., Ltd., Yokohama, Japan

[21] Appl. No.: 154,693

[22] Filed: Feb. 11, 1988

[30] Foreign Application Priority Data

Feb. 12, 1987 [JP] Japan .................................. 62-28357

[51] Int. Cl.$^4$ .................... H02K 1/18; H02K 21/28
[52] U.S. Cl. ...................................... 310/154; 310/64; 310/254
[58] Field of Search ................. 165/179, 182; 310/52, 310/63, 64, 83, 154, 254

[56] References Cited

U.S. PATENT DOCUMENTS

| | | | |
|---|---|---|---|
| 3,426,224 | 2/1969 | Esters | 310/154 |
| 4,237,393 | 12/1980 | Landgraf | 310/154 |
| 4,338,533 | 7/1982 | Gräfenschnell | 310/154 |
| 4,451,749 | 5/1984 | Kanayama et al. | 310/63 |
| 4,549,341 | 10/1985 | Kasabian | 310/42 |
| 4,671,125 | 6/1987 | Yabunaka | 310/83 |
| 4,678,954 | 7/1987 | Takeda et al. | 310/156 |

Primary Examiner—Patrick R. Salce
Assistant Examiner—D. L. Rebsch
Attorney, Agent, or Firm—Foley & Lardner, Schwartz, Jeffery, Schwaab, Mack, Blumenthal & Evans

[57] ABSTRACT

Elements which exhibit good thermal conductivity are disposed in contact with permanent magnets of an electric motor. These elements absorb heat from the magnets and reduce the rate at which the temperature of the magnets increases. The elements can be provided with fins and the like to increase the rate at which heat is released from the elements.

2 Claims, 3 Drawing Sheets

STARTER MOTOR FOR AUTOMITOVE ENGINE

BACKGROUND OF THE INVENTION

1. Field of the Invention

The present invention relates to a an electric motor which is required to output a large amount of power at sporadic intervals such as a starter motor for use in automotive engines or similar types of application, and more specifically to an improved arrangement which dissipates the heat produced during operation and which permits prolonged cranking without thermal damage.

2. Description of the Prior Art

FIG. 1 shows a prior art automotive starter motor arrangement. In this arrangement a DC electric motor 1 includes a stator 2, a rotor 3, a commutator 4 and a brush 5. As shown, the stator 2 is disposed within a steel housing 6 and about the rotor 3. A brush holder 8 secures the brush 5 in the appropriate position.

The DC-motor 1 is operatively connectable with the crankshaft of the engine (not shown) through a planetary type reduction gear 11 and a pinion 10 mounted on an output shaft 9.

An electromagnetic clutch 12 is arranged to selectively engage the shaft extending between an over-running clutch 13 and the reduction gear 11, by way of a shift lever 12a, in a manner so as to move the pinion 10 into mesh with a non-illustrated ring gear and therefore establish a drive connection between the pinon 10 and the motor 1.

During cranking of the engine, a large amount of power must be produced by the motor 1. This production is accompanied by the generation of a substantial amount of heat which tends to be transferred to the pole pieces 7 disposed on the inner periphery of the steel housing 6.

As the size of the starter motor has been reduced gradually over a period of time in accordance with the demand for more compact engine arrangements, the current models are such that the pole pieces 7 are usually made of alloys consisting of Nd, Fe, B or Al, Ni combinations which exhibit a loss of magnetism at elevated temperatures.

Accordingly, a drawback has been encountered in that these types of magnets tend to become excessively heated, e.g., from 320° to 330° C., and thus approach their Curie points in the event that engine cranking is continued for any length of time. As a result, it is necessary to appreciably reduce the length of time for which engine cranking can be continuously carried out in order to avoid an overheating situation wherein the starter motor becomes "burned out".

SUMMARY OF THE INVENTION

It is an object of the present invention to provide a starter motor or similar arrangement which is both compact and allows prolonged non-stop operation without thermal damage occuring.

In brief, the above object is achieved by an arrangement wherein elements which exhibit good thermal conductivity are disposed in contact with permanent magnets of an electric motor. These elements absorb heat from the magnets and reduce the rate at which the temperatures of the magnets increase. The elements can be provided with fins and the like to increase the rate at which heat is released from the elements.

More specifically, a first aspect of the present invention comes in the form of an electric motor which features: a permanent magnet; and thermal transfer means associated with said magnet for absorbing heat therefrom and for reducing the rate at which the temperature of the magnet rises during operation of the motor.

A second aspect of the invention comes in the form of a device which features: an electric motor; a plurality of permanent magnets, said permanent magnets forming part of said motor; an arrangement for selectively connecting said motor with a rotatable element of said device; and thermal transfer means associated with said permanent magnets for absorbing heat from said magnets.

DETAILED DESCRIPTION OF THE PREFERRED EMBODIMENTS

Figure 1:
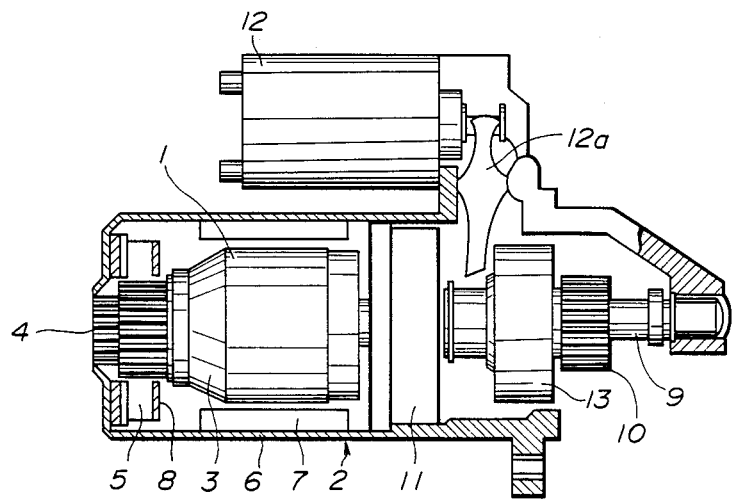
FIG. 1 shows in sectional elevation the prior art stater motor construction dissussed in the opening paragraphs of the instant disclosure.
Figure 2:
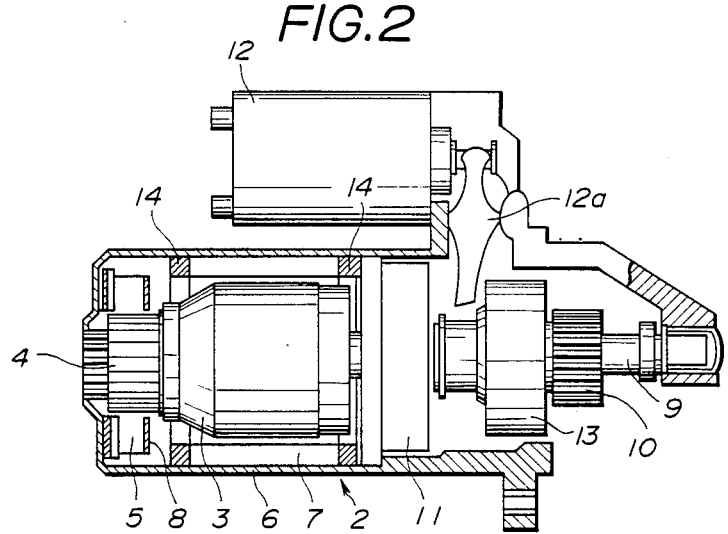
FIG. 2 shows in sectional elevation a first embodiment of the present invention.

FIG. 2 shows, in sectional elevation, a starter motor incorporating a first embodiment of the present invention. As will be apparent, the construction and arrangement of the device is essentially the same as that shown in FIG. 1 and as such a detailed description of the construction and arrangement will be omitted for brevity. The arrangement disclosed in FIG. 2 differs from the prior art arrangement in that heat dispersing arrangements are provided at each end of the pole pieces 7 of the stator 2. In the first embodiment these heat dispersing elements take the form of annular elements 14 made of aluminium (by way of example) which exhibit good thermal conductivity and which are arranged in contact with the ends of the plurality of pole pieces 7 in manner that heat can be transfered therefrom into the elements 14.

According to this arrangement, when the engine is being cranked the heat produced in the armature is transferred from the rotor 3 to the nearby pole pieces and thereafter to the annular elements 14. This disperses the total amount of heat in such a manner that the temperature of the pole pieces is reduced and held below their Curie points for a prolonged period.

Figure 3:
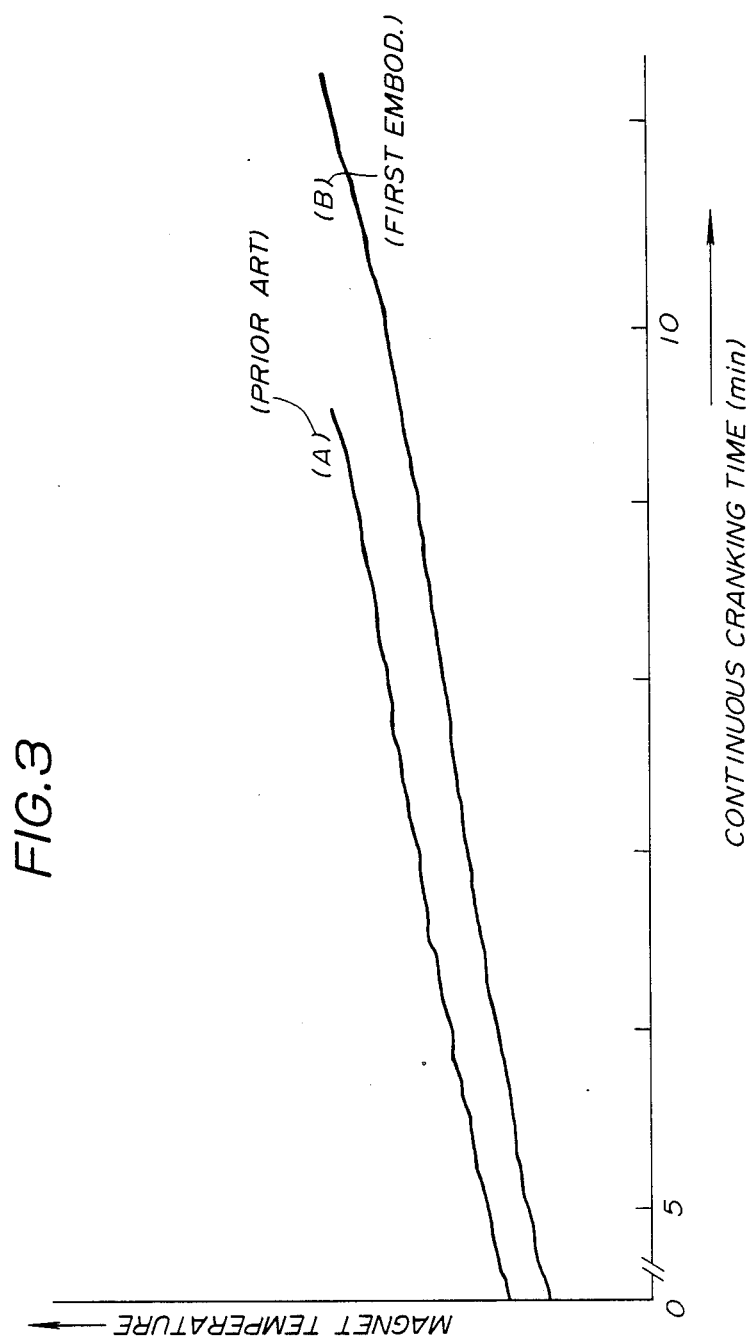
FIG. 3 is a graph showing in terms of magnet temperature and the time for which engine cranking is carried out (non-stop) the increase in time for which it is possible to crank the FIG. 1 prior art arrangement (A) and the FIG. 2 embodiment (B), respectively.

The effect of the present invention is demonstrated graphically in FIG. 3. As shown, the provision of the annular elements 14 is such as to increase the time required for the pole pieces to become heated to a critical level. In this figure, trace A denotes the temperature of the pole pieces in the prior art arrangement while trace B denotes the corresponding temperature in the starter motor equipped with the first embodiment of the present invention. As will be seen, it requires more than 11 minutes for the pole pieces of the first embodiment to rise to the same temperature reached in the prior art arrangement in a little over 9 minutes. Further, as apparent, the temperature in the first embodiment is constantly lower that of the prior art. Accordingly, it is possible to continue non-stop cranking of the engine for a longer period than with the prior art without "burning out" the device.

Figure 4:
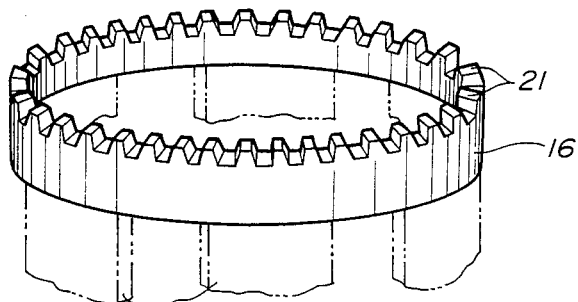
FIG. 4 is a perspective view of heat absorbing/radiating element which characterizes a second embodiment of the present invention.

FIG. 4 shows a second embodiment of the present invention. In this arrangement the annular member 16 is provided with fins 21. These fins increase the rate at which heat is radiated or otherwise released from the main body of the annular member and thus serve to prolong the time required for the temperature of the pole pieces to approach the above mentioned critical level.

Figures 5, 6:
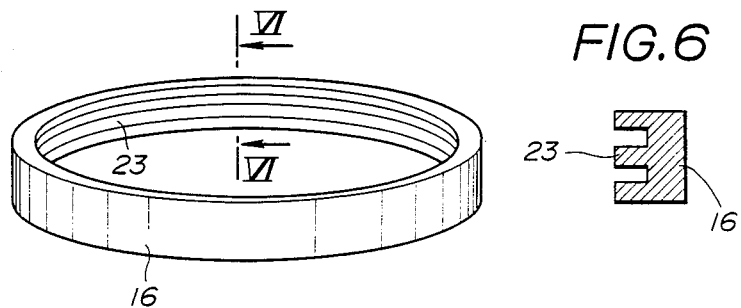
FIG. 5 is a perspective view of a heat absorbing-/radiating element according to a third embodiment of the present invention.
FIG. 6 is a sectional view taken along section line VI—VI of FIG. 5.

FIGS. 5 and 6 show a third embodiment of the present invention. In this arrangement the finning 23 is formed about the inner periphery of the member 16 as particularly apparent from FIG. 6. Similar to the second embodiment, the third emodiment also features an increased heat capacity due to the finning and thus also exhibits good temperature reduction characteristics.

Figure 7:
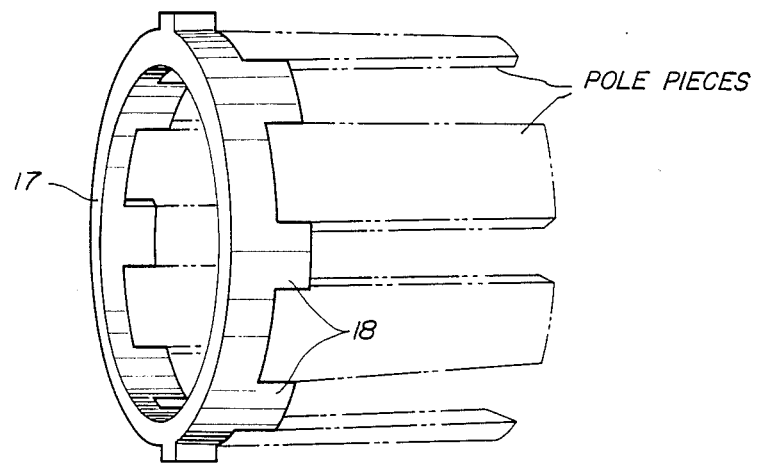
FIG. 7 is a perspective view of an element which characterizes a fourth embodiment of the present invention.

FIG. 7 shows a fourth embodiment of the present invention. In this arrangement the annular element 17 is formed with axially extending crenulations 18 which are arranged to extend in between each of the pole pieces 7. These extensions not only increase the mass of the element 17, and therefore the heat capacity of the same, but they also increase the connection between the pole pieces and therefore improve the heat transfer characteristics therebetween.

It will be understood that the invention is not limited to the use of the elements disclosed hereinabove and various changes and modifications can be made without departing from the scope of the invention. Merely by way of example, it is possible to combine the second, third and fourth emodiments into a single unit which features both radial and axially extending finning along the crenulations which characterize the fourth embodiment.

What is claimed is:

1. An electric motor comprising:
   a plurality of stationary permanent magnets, said permanent magnets forming part of said motor;
   an arrangement for selectively connecting said motor with a rotatable element of said device; and
   thermal transfer means associated with said permanent magnets for absorbing heat from said magnets;
   wherein said thermal transfer means comprises a stationary arrangement for dispersing the heat absorbed therein into the environment surrounding the same;
   said thermal transfer means comprises a member having good heat conductivity and said heat dispersing arrangement takes the form of a stationary fin formed on said member;
   said plurality of stationary permanent magnets are disposed within a stationary housing of said electric motor, said permanent magnets are aligned with one another and said member comprises an annular member which is disposed in contact with the ends of the aligned magnets; and
   said annular member has crenulations formed thereon, said crenulations projecting between adjacent magnets in such a manner as to increase the ease with which heat is transferred from the magnets to said annular member.

2. A starter motor for an automotive vehicle comprising:
   an essentially stationary cylindrical housing;
   a plurality of stationary, elongate permanent magnets disposed about the inner periphery of said stationary housing in such a manner that said magnets extend essentially parallel to the axis of said housing, said magnets having first and second ends;
   a first annular, nonmagnetic, heat-absorbing member disposed within said housing and in contact with the first ends of said magnets;
   a second annular, nonmagnetic, heat-absorbing member disposed within said housing and in contact with the second ends of said magnets, said second member being discrete from said first member; and
   stationary fin means for increasing the amount of heat exchange with the ambient atmosphere, said fin means being formed on said first and second members.

* * * * *